Sept. 26, 1961 G. T. McCLURE ET AL 3,001,832
BRAKE CYLINDER RELEASE VALVE DEVICE
Filed Oct. 26, 1959
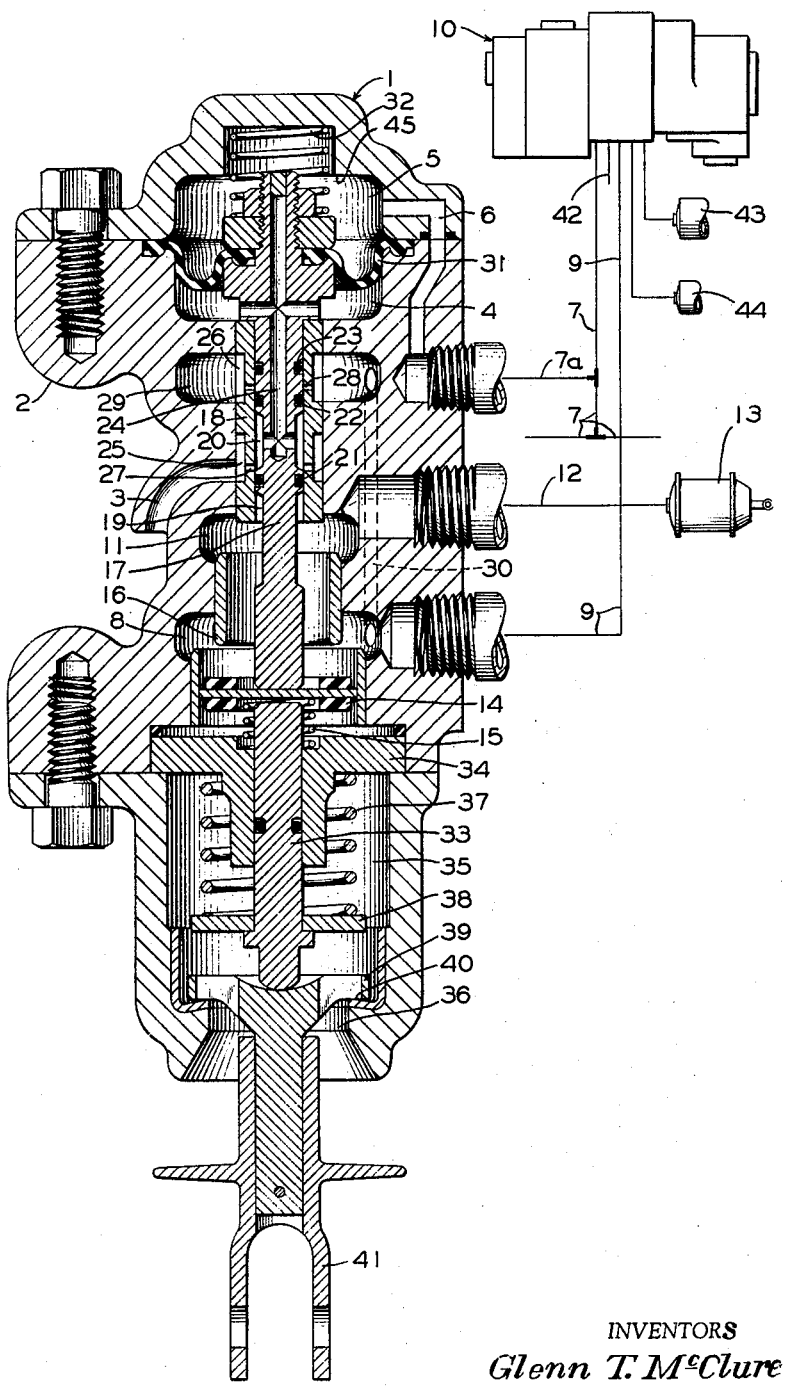
INVENTORS
Glenn T. McClure
BY Thomas F. Hursen
Henry E. Otto
Attorney

United States Patent Office 3,001,832
Patented Sept. 26, 1961

3,001,832
BRAKE CYLINDER RELEASE VALVE DEVICE
Glenn T. McClure, McKeesport, and Thomas F. Hursen, Monroeville, Pa., assignors to Westinghouse Air Brake Company, Wilmerding, Pa., a corporation of Pennsylvania
Filed Oct. 26, 1959, Ser. No. 848,775
7 Claims. (Cl. 303—68)

This invention relates to brake cylinder release valve devices of the type used in fluid pressure brake equipment for railway cars and the like to permit pressure fluid to be locally released from each brake cylinder on the car while the latter is detached from a train, without depleting the pressure fluid in a local source (such as a reservoir or reservoirs) from which such brake cylinder is then charged.

These brake cylinder release valve devices comprise valve means normally biased to a so-called normal position to connect each brake cylinder with a control pipe leading to a triple valve, such as of the well-known "AB" type, so that fluid will normally be provided in each brake cylinder at the pressure provided in the control pipe by the triple valve responsively to variations in pressure of fluid in a brake pipe. The valve means of the release valve device is manually actuatable to a release position to disconnect the control pipe from each brake cylinder and connect the latter to a vent, so that brake sylinder pressure may be reduced without depleting pressure of fluid in the local source if it is then connected to the control pipe via the triple valve.

The principal object of this invention is to provide an improved brake cylinder release valve device of the above general type which is less expensive to manufacture and more positive in operation than brake cylinder release valve devices of types heretofore proposed, and which embodies a novel control arrangement for normally maintaining the valve device in normal position and for, under certain conditions, automatically maintaining said valve device in release position when manually actuated thereto.

The brake cylinder release valve device embodying the invention comprises, briefly, a piston reciprocable in a casing and subject to pressure of fluid in one chamber having fluid pressure connection with the brake pipe and to a bias pressure which pressures act jointly in opposition to pressure of fluid in a lock-up chamber also acting on said piston, valve means operatively connected to said piston and operatively biased by said bias pressure to a normal position in which it connects the control pipe with the brake cylinder and connects the lock-up chamber to atmosphere and disconnects the brake cylinder from atmosphere, and actuator means manually operable to shift said valve means to another position in which it disconnects the lock-up chamber from atmosphere and connects it to the control pipe and disconnects the control pipe from the brake cylinder and connects the latter to atmosphere, whereby if the pressure of control pipe fluid supplied in said other position of said valve means to the lock-up chamber exceeds the pressure then existing in said one chamber by at least a predetermined degree, said valve means will be maintained in said other position until pressure is increased in the brake pipe and hence in said one chamber.

The valve means of the improved brake cylinder release valve device preferably comprises a reciprocable valve member connected to the piston and controlling all fluid pressure connections controlled by said valve means except connection and disconnection of the control pipe with the brake cylinder; and a poppet-type valve which is contained in an inlet chamber open to the control pipe, and controls only connection of the control pipe with the brake cylinder, and is biased by a light spring to a seated position and operatively held unseated by the valve member when in normal position. With this arrangement, when the lock-up chamber is charged and the brake pipe is vented, the valve will not be pulled to its seat by a heavy force corresponding to lock-up chamber pressure acting over the piston, but will desirably be seated merely by said light spring and thereafter held on its seat merely by the light spring and inlet chamber pressure to avoid scoring the valve-seat engaging part of said valve. Also, the valve member preferably establishes the various recited connections established in said other position of said valve means before the valve is fully closed, so that if the brake pipe pressure in said one chamber is low enough when the actuator means is operated, the actuator means need not fully seat said valve and need merely operatively shift said valve member via said valve far enough to establish said various connections, whereupon said valve member will be snapped out of operative contact with said valve and permit it to be promptly but gently seated by the light spring.

Other objects and advantages will become apparent from the following more detailed description of the invention and from the accompanying drawing wherein the single figure is an elevational section view of a brake cylinder release valve device embodying the invention shown associated with other components, represented diagrammatically, of a fluid pressure brake equipment for a railway car.

*Description*

As shown in the drawing, there is provided on each railway car a brake cylinder release valve device 1 embodying the invention and comprising a sectionalized casing 2 providing an exhaust port 3, a lock-up chamber 4, a chamber 5 connected via a passage 6 and a port to a conduit 7a, such as a branch of a brake pipe 7, in which pressure of fluid is reduced during a brake application, an inlet chamber 8 connected via an inlet port to a control pipe 9 leading to a triple or brake controlling valve device 10, and an outlet chamber 11 connected via an outlet port to a brake cylinder pipe 12 leading to a plurality of brake cylinders 13 (only one of which is shown).

A valve 14, preferably of the disc-shaped poppet type, controls connection of the inlet chamber 8 with the outlet chamber 11 and is disposed in the inlet chamber and biased by a light helical spring 15 into contact with an annular valve seat 16 press fit into a bore through a casing partition separating said chambers. Arranged coaxially with the valve 14 is a cylindrical valve member 17 which is sealingly reciprocable in a bushing 18 having press fit engagement with a bore in a casing partition extending from chamber 4 to the outlet chamber 11. The valve member 17 has a depending portion, serving as a pusher stem, which projects exteriorly of the bushing 18 and with substantial radial clearance into annular seat 16 and is adapted to abut and unseat valve 14 under a condition hereinafter to be described. The valve member 17 also has formed in its exterior two spaced annular elongated cavities 19, 20 and carries three spaced O-ring type seals 21, 22, 23. Cavity 19 is constantly uncovered to outlet chamber 11, whereas cavity 20 is constantly open to chamber 4 via suitable radial ports and an internal passageway 24 in the valve member. Seal 21 is disposed between the cavities 19, 20; and seals 22, 23 are respectively disposed near and farther from the opposite end of the cavity 20.

Intermediate its ends the bushing 18 has two spaced annular elongated cavities 25, 26 formed in its outer cylindrical surface and each open via respective rings of radial ports 27, 28 in said bushing to the bushing bore in which the valve member 17 is reciprocable. Cavity 25, which is adjacent the outlet chamber end of bushing 18, is constantly open to exhaust port 3; whereas cavity 26, which is adjacent the chamber 4 end of said bushing, is constantly open to a chamber 29 connected via a cored passage 30 to the inlet chamber 8 and thus constituting part of the inlet chamber.

A piston 31, preferably of the diaphragm-piston type, is reciprocable in the casing and subject at one side to pressure of fluid in chamber 5 and to pressure of a helical bias spring 32 of greater force than spring 15, and is subject at the opposite side to pressure of fluid in chamber 4. At its said opposite side piston 31 is operatively connected to the end of valve member 17 remote from its aforementioned depending portion.

A pusher stem 33 extends through and is sealingly reciprocable in a bore through a partition member 34. Member 34 is sealingly clamped between sections of the casing and separates inlet chamber 8 from a chamber 35 open to atmosphere via an opening 36 in the lower end of said casing, said member also serving as a seat for spring 15. A helical spring 37, disposed in chamber 35 and encircling stem 33, bears against member 34 and acts through a washer 38 and a flange formed on said stem to bias said stem to a normal or lowermost position, in which it is shown, defined by coaxial contact of the lower end of said stem with a ported dish-shaped camming flange 39 which, in turn, is operatively biased into contact with an annular ledge 40 surrounding opening 36. When stem 33 is in normal position, its upper end is spaced coaxially from the valve 14. The camming flange 39 and a depending yoke 41 coaxially connected thereto constitute parts of a manually operable actuator assemblage which is tiltable universally relative to ledge 40, by application of a lateral force to said yoke, to cause said camming flange to shift the pusher stem 33 upward against resistance of spring 37 and into abutting contact with valve 14 and through such contact shift the latter toward its seat 16 and at the same time correspondingly shift valve member 17.

*Operation*

Assume initially that the railway car is connected in a train. To initially charge the equipment, the brake pipe 7 is charged at the locomotive with fluid at the normal charge value of brake pipe pressure in the well-known manner. On each car, some of the pressure fluid supplied to the brake pipe 7 will flow via a branch thereof to the brake controlling valve device 10 which may be of the well-known "AB" type fully disclosed in U.S. Patent 2,031,213 granted in 1936. This valve device comprises, briefly, valve means (not shown) responsive to charging of the brake pipe 7 to connect the control pipe 9 to a release pipe 42 for venting said control pipe, and connect the brake pipe 7 to an auxiliary reservoir 43 and an emergency reservoir 44 for charging said reservoirs to equality with brake pipe pressure.

Meanwhile, some pressure fluid will also flow from the brake pipe 7 via conduit 7a to chamber 5 of the brake cylinder release valve device 1 and cooperate with spring 32 to hold the piston 31 in contact with a suitable stop, such as the chamber 4 end of bushing 18, and thereby maintain the valve member 17 in a normal position, in which it is shown. With valve member 17 in this position, cavity 20 registers with port 27 for connecting chamber 4 to exhaust port 3; seal 21 sealingly isolates cavity 19 and hence outlet chamber 11 from the port 27 and hence from exhaust port 3; seals 22, 23 straddle port 28 and thereby sealingly isolate chamber 29 from cavity 20 and chamber 4, respectively; and the depending portion of said valve member abuts and holds valve 14 unseated against resistance of the light bias spring 15 for thereby causing each brake cylinder 13 to be connected to the control pipe 9 via said valve.

Assuming now that while the car is in the train, brake pipe pressure is reduced at an emergency rate, device 10 will operate to locally vent the brake pipe 7 and also cut off control pipe 9 from release pipe 42, and supply pressure fluid from both the auxiliary reservoir 43 and emergency reservoir 44 to the control pipe for supply at large capacity and without substantial restriction past unseated valve 14 to each brake cylinder 13. It is to be noted that valve 14 will be maintained unseated because valve member 17 will be maintained biased to normal position by spring 32; and that, even though the brake pipe and hence chamber 5 are vented, spring 32 is of such selected strength as to operatively exert a bias force on valve member 17 that will exceed the combined opposing bias force exerted thereon by spring 15 and by a maximum pressure (corresponding to equalization of pressures in both reservoirs 43, 44 into the control pipe and brake cylinders) which will then effectively act over the lower end of the depending portion of said valve member. Hence, since spring 32 is strong enough to operatively maintain valve 14 unseated during an emergency brake application during which the brake pipe 7 is vented, it will be apparent that said spring will be more than adequate to maintain valve 14 operatively unseated when, during a full service application of brakes, brake pipe pressure is only partially reduced and the pressure effectively acting on the lower end of valve member 17 merely corresponds to that obtained by equalization of auxiliary reservoir pressure fluid into the control pipe 9 and each brake cylinder 13. Thus, during reductions and restorations of brake pipe pressure, the valve 14 will be operatively maintained unseated to permit brake cylinder pressure to be controlled according to the pressure provided in control pipe 9 by the brake pipe pressure-controlled device 10, in the same manner as if the control pipe was connected directly to the brake cylinder pipe 12.

If the car is "spotted" on a siding and detached from the train, the consequent emergency venting of the brake pipe 7 will cause the device 10 to maintain the auxiliary reservoir 43 and emergency reservoir 44 connected to the control pipe 9, which in turn will be connected to each brake cylinder 13 via unseated valve 14, as just described. To vent each brake cylinder 13 so that the car may be moved, without venting the reservoirs 43, 44, the operator applies a lateral thrust force to yoke 41 to tilt the camming flange 39 for moving pusher stem 33 upward against resistance of spring 37. As stem 33 moves upward, it will abuttingly contact the non-seating side of valve 14 and then, through such contact, shift said valve upward toward its seat 16 and at the same time also shift the valve member 17 upward a corresponding degree because the latter then abuts the seating side of said valve. As soon as valve member 17 has thus been shifted upward a slight degree, and before the valve 14 has been moved upward far enough to contact seat 16, said valve member will attain the lower limit of a release position, in which seal 21 is disposed above bushing port 27 and thus sealingly isolates cavity 20 and hence chamber 4 from port 27 and the exhaust port 3; seal 22 is disposed above bushing port 28 for uncovering to cavity 20 to port 28 and thus permitting inlet chamber pressure fluid to flow from chamber 29 to chamber 4 via opening 24; and seal 21 is disposed above bushing port 27 for uncovering cavity 19 to outlet chamber 11 and thus permitting brake cylinder pressure fluid to be released by flow from pipe 12 to the exhaust port 3. Since the brake pipe 7 and hence the chamber 5 are now vented, the pressure fluid thus supplied to chamber 4 from the reservoirs 43, 44 via device 10, control pipe 9, passage 30, chamber 29, port 28, cavity 20 and opening 24 will cause the piston 31 to promptly shift upward against resistance of spring 32 and thereby carry valve member 17 to an upper limit of its release position defined such as by contact of the piston with a stop shoulder 45. With valve member 17 in this upper limit of its release position, the same fluid pressure connections will be established as in the lower limit of said position (because of the length of the respective cavities in the bushing 18 and valve member and arrangement of the respective seals), but the depending portion of the valve member will be retracted into the annular opening of seat 16 sufficiently to permit valve 14 to be promptly seated by spring 15; whereupon the control pipe 9 and hence the reservoirs 43, 44 will be effectively cut off from the outlet chamber 11 and brake cylinders 13, while the brake cylinders are being vented via cavity 19 and exhaust port 3.

It is to be noted that the valve member 17 will be promptly and automatically shifted from the lower limit to the upper limit of its release position by rapid charging of lock-up chamber 4, and hence a negligible reduction in pressure fluid in the control pipe and reservoirs will occur between the time the outlet chamber 11 is uncovered to exhaust port 3 via cavity 19 in said lower limit position and the time the valve 14 is seated. It will also be noted that the bushing ports 27 may be of any desired collective flow capacity so as to restrict, if desired, the rate at which brake cylinder pressure fluid is released. Also, since the reservoir pressure fluid supplied to the lock-up chamber 4 will maintain the valve member 17 in the upper limit of its release position, manual force may be removed from the yoke 41 after the yoke has been given a jerk sufficient to move valve member 17 to the lower limit of its release position, thereby saving time of the operator, because the brake cylinders will thereafter be automatically and completely vented at a rate corresponding to the selected collective flow capacity of bushing ports 27.

Pressure in the lock-up chamber 4 will maintain the valve member 17 in the upper limit of its release position indefinitely until the chamber 5 is recharged from the brake pipe 7 upon the car being reconnected to a locomotive; whereupon brake pipe pressure supplied to chamber 5, assisted by the spring 32, will operatively return the valve member 17 to its normal position, in which it is shown.

If while the car is connected to a locomotive and the brake pipe 7 is charged to above a predetermined value (such as about 35 p.s.i., which is less than that corresponding to a full service reduction in brake pipe pressure), yoke 41 is rocked against the resistance of spring 37 and operatively shifts the valve member 17 to the lower limit of its release position, said valve member will not automatically snap up to the upper limit of said position because the cumulative bias exerted by spring 32 and by brake pipe pressure in chamber 5 acting on piston 31 will exceed the opposing bias of spring 15 and the less than maximum pressure effectively acting on the lower end of said valve member. Hence, sufficient force should be exerted on the yoke 41 to effect full seating of the valve 14 especially if a full service reduction in brake pipe pressure has been effected, because under such condition, the device 10 will maintain the auxiliary reservoir 43 to the control pipe 9; and unless the valve 14 is fully seated, pressure fluid will be exhausted from each brake cylinder and from the auxiliary reservoir. However, brake cylinder pressure fluid will be released only if, and so long as, the valve member is manually maintained in release position by continuous application of force to the yoke; and as soon as such force is removed, the valve member 17 will automatically be operatively returned to normal position for cutting off each brake cylinder 13 from the exhaust port 3 and operatively reopening valve 14. This arrangement is desirable to assure that each brake cylinder will not be automatically completely vented if the yoke 41 should be rocked momentarily and unintentionally and operatively shift the valve member 17 to the lower limit of its release position at a time when the brake pipe is charged above 35 p.s.i.; however, it permits intentional release of brake cylinder pressure to any desired degree, for example, to completely release brake cylinder pressure at the bottom of each of a series of long grades without resetting a retaining valve (not shown) at the bottom and top of each such grade if such retaining valve should be interposed in the release pipe 42 to prevent complete release of brake cylinder pressure as the train proceeds down each such grade.

It is to be noted that while the conduit 7a has been shown and assumed to be connected to the brake pipe 7, such conduit may if desired be connected to the quick action chamber provided within device 10 and in which pressure of fluid is reduced during a brake application and to substantially the same degree as brake pipe pressure. An advantage in connecting the conduit 7a to this quick action chamber would be that the air supplied to the chamber 5 would be filtered by the same strainer which is disposed in the device 10 and filters the air supplied to the quick action chamber.

It is also to be noted that the valve 14 is preferably separate from the valve member 17, rather than being positively connected thereto, so that the valve 14 will be promptly yet gently biased to its seat 16 by light spring 15 when the valve member 17 snaps to the upper limit of its release position. If desired, however, the valve 14 may be positively, rather than merely operatively, connected to the valve member 17 and spring 15 may be eliminated; and in such case, the valve 14 would be pulled to its seat by preponderant pressure of fluid supplied to the lock-up chamber 4 if said valve member is operatively shifted to the lower limit of release position by the actuator assemblage 41, 39, 33 at a time when pressure in chamber 5 is below the illustrative 35 p.s.i.

Also, if preferred, the valve member 17, instead of being coaxially connected to the piston 31 as shown, may merely abut and thus be operatively connected to said piston. In such event, the valve member 17 would be biased to normal position while the brake pipe is charged or vented provided the lock-up chamber 4 is vented, but upon charging of the lock-up chamber 4 merely the piston 31 would be snapped upward against resistance of spring 32 and the bias of spring 15 should preferably be increased enough to permit it to close the valve 14 and also shift the valve member up into release position despite the opposing effect of lock-up chamber pressure which would then act on the upper end of said valve member. Once valve 14 is closed, however, inlet chamber pressure would act over the full area of said valve within the seat 16 to hold said valve closed until chamber 5 is recharged.

Thus, while the arrangement as disclosed in the drawing is preferred, the scope of the invention should not be limited except as restricted by the appended claims.

Having now described the invention, what we claim as new and desire to secure by Letters Patent, is:

1. In a brake equipment including a brake pipe, a source of fluid under pressure, and a brake cylinder: a brake cylinder release valve device comprising a casing providing a lock-up chamber, another chamber communicating with the brake pipe, an inlet chamber communicating with the source, and an outlet chamber communicating with the brake cylinder, a valve controlling connection of the inlet chamber with the outlet chamber, a piston subject opposingly to pressures of fluid in said other chamber and in said lock-up chamber, valve means operatively connected to said piston and having a normal position in which it connects said lock-up chamber to atmosphere and disconnects said outlet chamber from atmosphere and also operatively opens said valve, bias means urging said valve means to normal position against opposition of lock-up chamber pressure acting on said piston, and actuator means manually operable against a resilient bias to operatively close said valve and shift said valve means to another position in which it disconnects said lock-up chamber from atmosphere and connects said lock-up chamber with said inlet chamber and connects said outlet chamber with atmosphere, whereby said valve means will be maintained biased to normal position so long as said lock-up chamber is vented, and will upon actuation to said other position by said actuator means be maintained in said other position by lock-up chamber pressure acting on said piston provided and so long as lock-up chamber pressure exceeds the pressure in said other chamber by at least a predetermined degree sufficient to overcome said bias means.

2. For use with a brake controlling valve device of the type responsive to charging of a brake pipe to charge a reservoir means and connect a control pipe to a release pipe, and responsive to a reduction in brake pipe pressure to cut off the control pipe from the release pipe and supply pressure fluid to the control pipe from the reservoir means: a brake cylinder release valve device comprising a casing providing a lock-up chamber, another chamber having fluid pressure connection with the brake pipe, an inlet chamber connected to the control pipe, and an outlet chamber connected to the brake cylinder, a valve controlling connection of the inlet and outlet chambers and operative when open to provide in the brake cylinder fluid at the pressure of fluid provided in the control pipe, means biasing said valve to closed position, reciprocable means including piston means and valve means operably connected thereto, said reciprocable means being subject opposingly to pressures of fluid in said other chamber and in said lock-up chamber, other means operatively urging said valve means to a normal position in which it connects said lock-up chamber to atmosphere and disconnects said outlet chamber from atmosphere and also operatively opens said valve against resistance of said biasing means, actuator means manually operable against a spring bias to apply a thrust force to and shift said valve to closed position, and means operatively connecting said valve and valve means for operatively shifting said valve means to a release position responsively to movement of said valve to closed position, said valve means being operative in release position to disconnect said lock-up chamber from atmosphere and connect said lock-up chamber with said inlet chamber and connect said outlet chamber with atmosphere, whereby upon removal of such thrust force said valve means will be maintained in release position by said reciprocable means and said valve will remain closed provided and so long as the pressure of fluid supplied to said lock-up chamber from said inlet chamber exceeds the pressure existing in the brake pipe and hence in said other chamber by at least a predetermined degree sufficient to overcome the bias of said other means.

3. A brake cylinder release valve device for use in brake equipment including a brake pipe, a source of fluid under pressure, and a brake cylinder, said valve device comprising a casing providing a lock-up chamber, another chamber communicating with the brake pipe, an inlet chamber communicating with the source, and an outlet chamber communicating with the brake cylinder, a valve contained in the inlet chamber and controlling connection of the inlet chamber with the outlet chamber and biased to a closed position, a piston reciprocable in the casing and subject to pressure of fluid in said other chamber acting over the full effective area thereof and to the opposing pressure of fluid in the lock-up chamber acting over an annular area thereof, a valve member coaxially connected at one end to the lock-up chamber side of said piston and subject at the opposite end to pressure of fluid in the outlet chamber, means operatively biasing said valve member to a normal position in which it operatively opens said valve against its bias and also connects said lock-up chamber to atmosphere and disconnects said outlet chamber from atmosphere, said valve member having a release position in which it disconnects said lock-up chamber from atmosphere and connects said lock-up chamber with said inlet chamber and connects said outlet chamber with atmosphere and is withdrawn from operative contact with said valve to prevent it from operatively opening the latter, and actuator means manually operable against a resilient bias to operatively apply a thrust force to and close said valve and shift said valve member to release position, whereby said valve member will be maintained biased to normal position so long as said lock-up chamber is vented, and whereby once said valve member is actuated to release position it will remain in release position provided and so long as the pressure of fluid supplied from said inlet chamber to said lock-up chamber exceeds the pressure in said other chamber by at least a predetermined degree.

4. A brake cylinder release valve device according to claim 3, wherein said valve member has a release position which is defined between and includes two points in its path of reciprocable movement, one of which points is nearer to normal position than the other point, and wherein said valve member attains said one point prior to closure of said valve, such that if the pressure of fluid supplied to the lock-up chamber via said valve member at said one point exceeds the pressure of fluid in said other chamber by at least said predetermined degree, said valve member will be automatically shifted, without assistance from the thrust force, to the other point in which it is retracted out of operative contact with said valve and permits the latter to be closed by its said bias, whereby under the condition just described said valve need not be moved all the way to closed position by said actuator means.

5. For use with a brake controlling valve device of the type responsive to charging of a brake pipe to charge a reservoir means with fluid under pressure and connect a control pipe to a release pipe and responsive to venting of the brake pipe to cut off the control pipe from the release pipe and connect the control pipe to the reservoir means: a brake cylinder release valve device comprising a casing providing an exhaust port, a lock-up chamber, another chamber having fluid pressure connection with the brake pipe, an inlet chamber connected to the control pipe, and an outlet chamber connected to the brake cylinder, a poppet-type valve contained in the inlet chamber and controlling connection of the inlet chamber with the outlet chamber and biased by a light spring to a seated position, a piston reciprocable in the casing and subject to pressure of fluid in said other chamber acting over the full effective area thereof and to the opposing pressure of fluid in the lock-up chamber acting over an annular area thereof, a valve member coaxially connected at one end to the lock-up chamber side of said piston and subject at the opposite end to pressure of fluid in the outlet chamber, means operatively biasing said valve member to a normal position in which it operatively unseats said valve and also connects said lock-up chamber to the exhaust port and disconnects said outlet chamber from the exhaust port, said valve member having a release position in the nature of a release range defined between two predetermined limit positions and operative throughout this release range to disconnect said lock-up chamber from said exhaust port and connect said lock-up chamber to said inlet chamber and connect said outlet chamber to said exhaust port, said valve member when in the limit position remote from normal position being retracted sufficiently to permit seating of said valve by the light spring and when in the limit position nearest normal position being retracted an insufficient distance to permit full seating of said valve by the light spring, and operator-actuated means operable against a spring bias to apply a thrust force to and shift said valve toward its seat and thereby through said valve shift said valve member to at least said nearest limit position of said release range such that when the other chamber is substantially vented the pressure fluid consequently supplied from the inlet chamber to the lock-up chamber will promptly act on said piston to snap said valve member to said remote limit position and permit seating of said valve, and said valve member will not be returned to normal position until the brake pipe and hence said other chamber is recharged.

6. For use in a fluid pressure brake equipment of the type comprising a brake pipe, a source of pressure fluid, and a brake cylinder: a brake cylinder release valve device comprising a casing providing an inlet chamber connectable to the source, an outlet chamber connectable to the brake cylinder, another chamber connectable to the brake pipe, piston means subject opposingly to pressures of fluid in said other chamber and in a lock-up chamber, valve means operatively connected to said piston means for movement therewith and having a normal position for establishing communication between said inlet chamber and outlet chamber and also connecting said lock-up chamber to a vent, means operatively biasing said valve means toward normal position, and operator-actuated means for moving said valve means against opposition of said biasing means to a release position in which it disestablishes said communication and cuts off said lock-up chamber from the vent and connects said inlet chamber to the lock-up chamber and connects the outlet chamber to the vent thereby to cause said valve means to be operatively maintained in release position against resistance of said biasing means provided and so long as the force exerted on said piston means by the pressure of fluid supplied to said lock-up chamber from said inlet chamber exceeds the opposing force exerted thereon by pressure fluid in said other chamber by a predetermined degree.

7. For use in a brake equipment of the type comprising a brake pipe, a source of pressure fluid, and a brake cylinder: a brake cylinder release valve device comprising a casing providing a lock-up chamber, another chamber connectable to the brake pipe, an inlet chamber connectable to the source, and an outlet chamber connectable to the brake cylinder, one valve means having a normal position in which it connects the lock-up chamber to atmosphere and cuts off the outlet chamber from atmosphere and a release position in which it disconnects the lock-up chamber from atmosphere and connects the lock-up chamber to the inlet chamber and connects the outlet chamber to atmosphere, another valve means controlling connection of the inlet chamber with the outlet chamber, means operatively exerting a bias force on said one valve means to move the latter to normal position, means providing an operative connection between said one and other valve means and responsive to movement of said one valve means to normal position to open said other valve means, operator-actuated means normally in one position and operable from such position to operatively close said other valve means and operatively through the operative-connection providing means cause movement of said one valve means to release position, and a piston subject opposingly to pressures of fluid in said other chamber and lock-up chamber and operatively connected to said one valve means to cause the latter to be maintained in release position against said bias force following return of said actuator means to its one position provided and so long as the pressure fluid supplied via said one valve means to said lock-up chamber exceeds the pressure in said other chamber by at least a predetermined degree sufficient to overcome said bias force.

References Cited in the file of this patent
UNITED STATES PATENTS

| | | |
|---|---|---|
| 2,687,921 | Ferguson et al. | Aug. 31, 1954 |
| 2,725,261 | Pickert et al. | Nov. 29, 1955 |
| 2,735,726 | Klinger et al. | Feb. 21, 1956 |
| 2,886,377 | Martin | May 12, 1959 |